United States Patent
Xue et al.

(10) Patent No.: US 11,690,047 B2
(45) Date of Patent: Jun. 27, 2023

(54) METHODS AND APPARATUS FOR CONFIGURING INTRA-SLOT TIME-DIVISION MULTIPLEXED TRANSPORT BLOCKS

(71) Applicant: QUALCOMM Incorporated, San Diego, CA (US)

(72) Inventors: Yisheng Xue, San Diego, CA (US);
Xiaoxia Zhang, San Diego, CA (US);
Jing Sun, San Diego, CA (US);
Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/343,436

(22) Filed: Jun. 9, 2021

(65) Prior Publication Data
US 2022/0400468 A1 Dec. 15, 2022

(51) Int. Cl.
*H04W 72/02* (2009.01)
*H04L 1/1812* (2023.01)
(Continued)

(52) U.S. Cl.
CPC .......... *H04W 72/02* (2013.01); *H04L 1/1819* (2013.01); *H04W 72/0446* (2013.01); *H04W 72/20* (2023.01)

(58) Field of Classification Search
CPC ............. H04W 72/02; H04W 72/0406; H04W 72/0446; H04L 1/1819
See application file for complete search history.

(56) References Cited

U.S. PATENT DOCUMENTS

2017/0135084 A1* 5/2017 Kuchibhotla ..... H04W 72/0406
2021/0075552 A1* 3/2021 Huang ................ H04W 64/00
(Continued)

FOREIGN PATENT DOCUMENTS

| WO | 2020006687 A1 | 1/2020 |
| WO | 2020033704 A1 | 2/2020 |
| WO | 2020172576 A1 | 8/2020 |

OTHER PUBLICATIONS

Huawei et al., "Sidelink Physical Layer Structure for NR V2X", 3GPP TSG RAN WG1 Meeting #99, R1-1911882, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019 Nov. 9, 2019, XP051823064, 35 Pages, Common and Dedicated Resource Pools, p. 4, Paragraph 2.3—p. 5, Figure 2, Section 4, p. 20, Paragraph Before Figure 14, and Figure 14.

(Continued)

*Primary Examiner* — Raj Jain
(74) *Attorney, Agent, or Firm* — Arent Fox LLP/Qualcomm Incorporated

(57) ABSTRACT

Aspects of the present disclosure include methods, apparatuses, and computer readable media for configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmitting the low-latency TB and the non-low-latency TB via a physical sidelink shared channel (PSSCH) and the control information via a physical sidelink control channel (PSCCH) to one or more peer UEs.

30 Claims, 13 Drawing Sheets

(51) Int. Cl.
    *H04W 72/0446*     (2023.01)
    *H04W 72/20*        (2023.01)

(56) References Cited

U.S. PATENT DOCUMENTS

| | | | | |
|---|---|---|---|---|
| 2021/0176735 A1* | 6/2021 | Deng | ............... | H04W 72/02 |
| 2021/0391951 A1* | 12/2021 | Lee | ............... | H04W 4/08 |
| 2022/0150730 A1* | 5/2022 | Freda | ............... | H04L 1/188 |

OTHER PUBLICATIONS

International Search Report and Written Opinion—PCT/US2022/071833—ISA/EPO—dated Jul. 26, 2022.

\* cited by examiner

1100

1105

RECEIVING, IN A SLOT, A LOW-LATENCY TRANSPORT BLOCK (TB) OCCUPYING ONE OR MORE FIRST TEMPORAL RESOURCES, A NON-LOW-LATENCY TB OCCUPYING ONE OR MORE SECOND TEMPORAL RESOURCES DIFFERENT FROM THE ONE OR MORE FIRST TEMPORAL RESOURCES, AND CONTROL INFORMATION OCCUPYING AT LEAST A PORTION OF THE ONE OR MORE FIRST TEMPORAL RESOURCES, WHEREIN THE LOW-LATENCY TB AND THE NON-LOW-LATENCY TB ARE TIME DIVISION MULTIPLEXE

1110

DECODING ONE OR MORE OF THE LOW-LATENCY TB OR THE NON-LOW-LATENCY TB IDENTIFIED IN THE CONTROL INFORMATION FOR THE PEER UE

*FIG. 11*

METHODS AND APPARATUS FOR CONFIGURING INTRA-SLOT TIME-DIVISION MULTIPLEXED TRANSPORT BLOCKS

BACKGROUND

Aspects of the present disclosure relate generally to wireless communications, and more particularly, to apparatuses and methods for configuring intra-slot time-division multiplexed transport blocks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a user equipment (UE) may transmit information directly to another UE via one or more sidelink channels. The transmitting UE may organize information in transport blocks (TBs) that are frequency division multiplexed. However, some TBs may include information that require low-latency transmission, while other TBs may include information suitable for non-low-latency transmission. Therefore, improvements in sidelink transmission may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmitting the low-latency TB and the non-low-latency TB via a physical sidelink shared channel (PSSCH) and the control information via a physical sidelink control channel (PSCCH) to one or more peer UEs.

Other aspects of the present disclosure include a user equipment (UE) having a memory comprising instructions, a transceiver, and one or more processors operatively coupled with the memory and the transceiver, the one or more processors configured to execute instructions in the memory to configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmit the low-latency TB and the non-low-latency TB via a physical sidelink shared channel (PSSCH) and the control information via a physical sidelink control channel (PSCCH) to one or more peer UEs.

An aspect of the present disclosure includes a user equipment (UE) including means for configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and means for transmitting the low-latency TB and the non-low-latency TB via a physical sidelink shared channel (PSSCH) and the control information via a physical sidelink control channel (PSCCH) to one or more peer UEs.

Some aspects of the present disclosure include non-transitory computer readable media having instructions stored therein that, when executed by one or more processors of a user equipment (UE), cause the one or more processors to configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmit the low-latency TB and the non-low-latency TB via a physical sidelink shared channel (PSSCH) and the control information via a physical sidelink control channel (PSCCH) to one or more peer UEs.

Aspects of the present disclosure include methods by a user equipment (UE) for receiving, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and decoding one or more of the low-latency TB or the non-low-latency TB identified in the control information for the peer UE.

Other aspects of the present disclosure include a user equipment (UE) having a memory comprising instructions, a transceiver, and one or more processors operatively coupled with the memory and the transceiver, the one or more processors configured to execute instructions in the memory to receive, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and decode one or more of the low-latency TB or the non-low-latency TB identified in the control information for the peer UE.

An aspect of the present disclosure includes a user equipment (UE) including means for receiving, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and means for decoding one or more of the low-latency TB or the non-low-latency TB identified in the control information for the peer UE.

Some aspects of the present disclosure include non-transitory computer readable media having instructions stored therein that, when executed by one or more processors of a user equipment (UE), cause the one or more processors to receive, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and decode one or more of the low-latency TB or the non-low-latency TB identified in the control information for the peer UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 11 illustrates an example of a method for transmitting a hybrid automatic repeat request response to time division multiplexed transport blocks according to aspects of the present disclosure.

DETAILED DESCRIPTION

Figure 1:
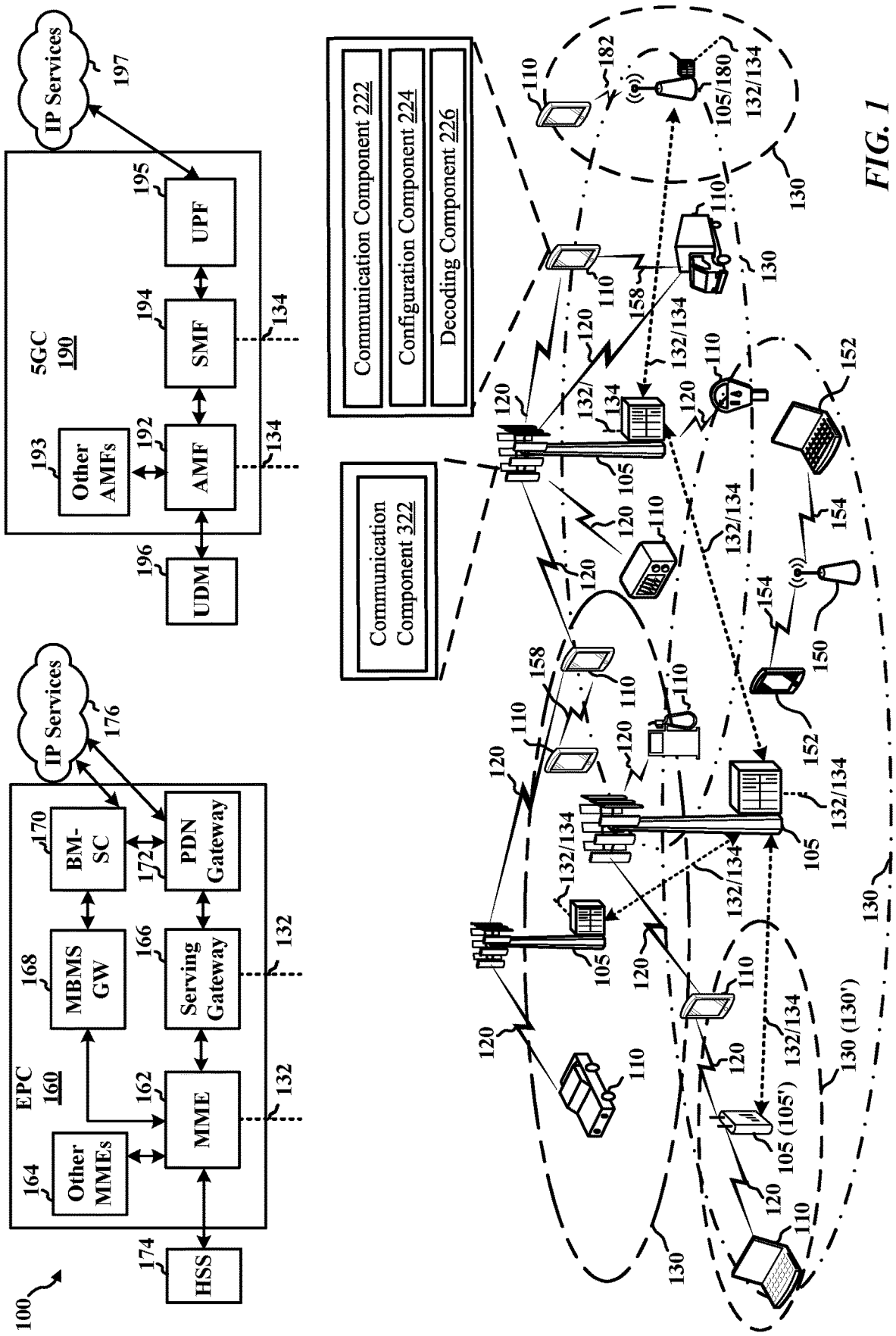
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some implementations, new radio (NR) sidelink (SL) may be used by a user equipment (UE) for exchanging messages (e.g., safety related messages), which may be periodical and/or of relatively small packet size, with nearby UEs (e.g., peer UEs capable of receiving information from the transmitting UE). The SL communication may be over sub-6 gigahertz (GHz) licensed bands. In mode 1 for in-coverage deployment, the transmit (TX) UE may receive a grant from a base station (BS), such as a gNB, for SL channel access. In mode 2 for autonomous deployment, the TX UE may use sensing to perform distributed channel access. Each SL channel access may include a physical sidelink control channel (PSCCH) and/or physical sidelink shared channel (PSSCH), occupying at least one sub-channel to transmit one transport block (TB) of information. SL control information (SCI) may be transmitted to include control information regarding the receive (RX) UE and/or how to decode the TB. Stage-one SCI may be carried by the PSCCH, which may include a reservation field and/or control information for demodulating and/or decoding of the PSSCH. Stage-two SCI may be carried by the PSSCH, which may include further control information regarding the decoding of the TBs in the PSSCH. To improve the reliability of unicast and/or groupcast transmission, the TX UE may request in SCI a TB-based hybrid automatic repeat request (HARQ) from the RX UE. The RX UE, in response to receiving the HARQ request, may transmit a HARQ response over a physical sidelink feedback channel (PSFCH).

In certain implementations, it may be desirable to transmit sidelink information over both sub-6 GHz bands and other licensed and/or unlicensed bands. For example, there is approximately 1.8 GHz of bandwidth available in the 5 GHz/6 GHz unlicensed band and approximately 7 GHz of bandwidth available in the 60 GHz unlicensed band. Such bandwidths availability may result in different deployment scenarios and/or use cases than conventional networks. In certain implementations, enhanced mobile broadband (eMBB) traffic may be implemented in sidelink communication.

When transmitting frequency division multiplexed TBs in a slot in mode 1, the transmitting UE may receive multiple downlink control information (DCI) 3-0 from the BS that allocates the sidelink resources in the same slot. In mode 2, the transmitting UE may perform sensing in parallel and independently for multiple TBs (i.e., resources for multiple TBs may be allocated in the same slot). Power splitting among multiple PSSCHs in the same slot may be implemented by the UE. A low-latency TB may have similar or the same HARQ timeline as other non-low-latency ones in frequency division multiplexed schemes.

In one implementation, the transmitting UE in a network may transmit multiple TBs to a peer UE via one or more sidelink data and/or control channels. The TBs may be time-division multiplexed in a single slot. A low-latency (round trip time (RTT) of less than a slot) TB may be configured as the first (in time) TB in the slot. One or more non-low-latency TBs may be configured after the first TB (low-latency). As such, the peer UE (i.e., peer UE) may be able to receive the low-latency TB first, and/or provide a HARQ response in a subsequent slot to indicate the success or failure of the peer UE in decoding the information in the low-latency TB.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. The UE 110 may include a configuration component 224 configured to arrange resources in slots with time-division multiplexed transport blocks. The UE 110 may include a decoding component 226 configured to decode received transport blocks that are time-division multiplexed. In some implementations, the communication component 222, the configuration component 224, and/or the decoding component 226 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

ABS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
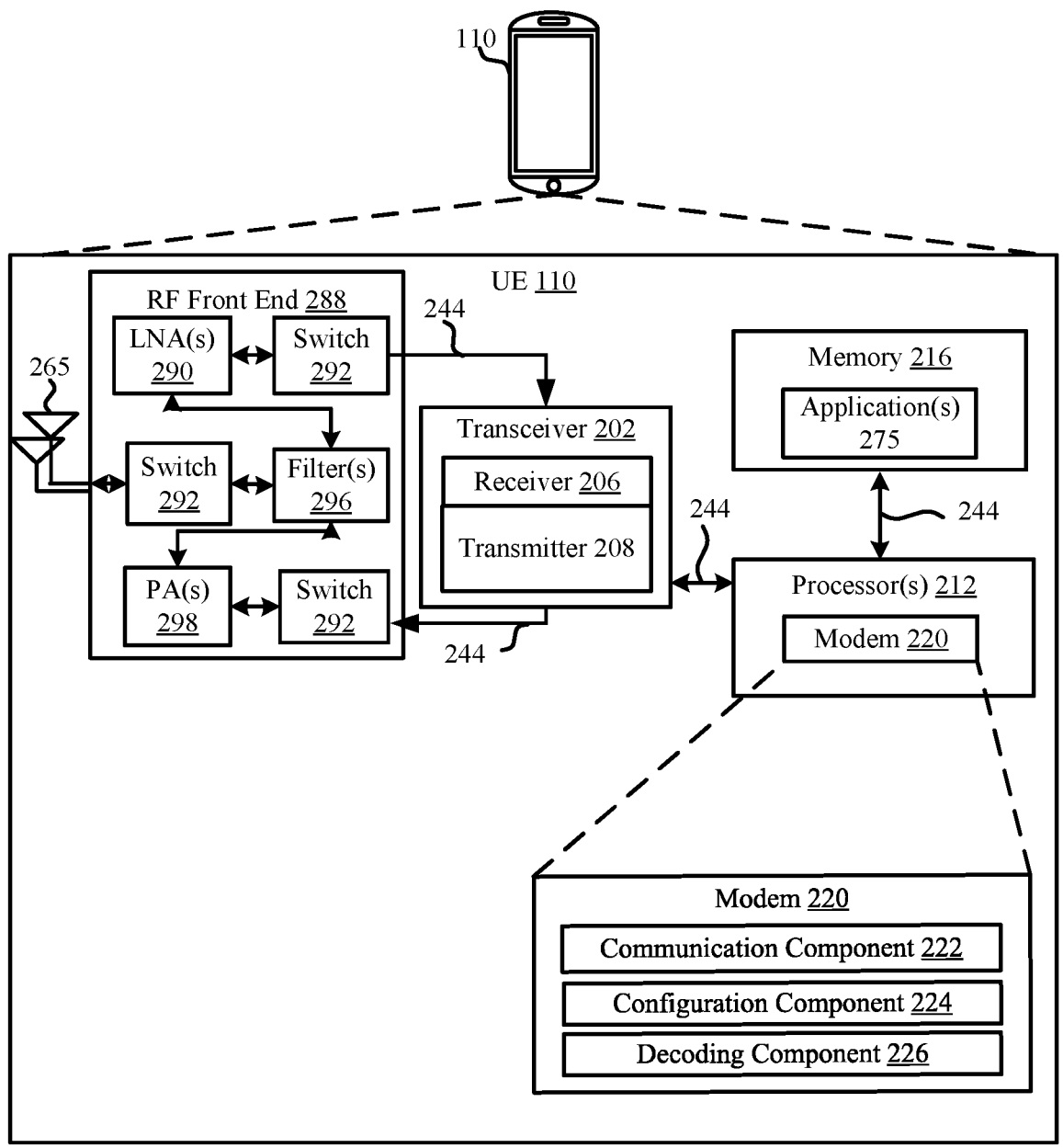
FIG. 2 is a schematic diagram of an example of a user equipment according to aspects of the present disclosure.

Referring to FIG. 2, one example of an implementation of the UE 110 may include a modem 220 having the communication component 222, the configuration component 224, and/or the decoding component 226. In one implementation, the UE 110 may include a communication component 222 configured to communicate with the BS 105 via a cellular network, a Wi-Fi network, or other wireless and wired networks. The UE 110 may include a configuration component 224 configured to arrange resources in slots with time-division multiplexed transport blocks. The UE 110 may include a decoding component 226 configured to decode received transport blocks that are time-division multiplexed.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the configuration component 224, and/or the decoding component 226 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the configuration component 224, and/or the decoding component 226, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the configuration component 224, and/or the decoding component 226, and/or one or more of the subcomponents, and/or data associated therewith, when UE 110 is operating at least one processor 212 to execute the communication component 222, the configuration component 224, and/or the decoding component 226, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
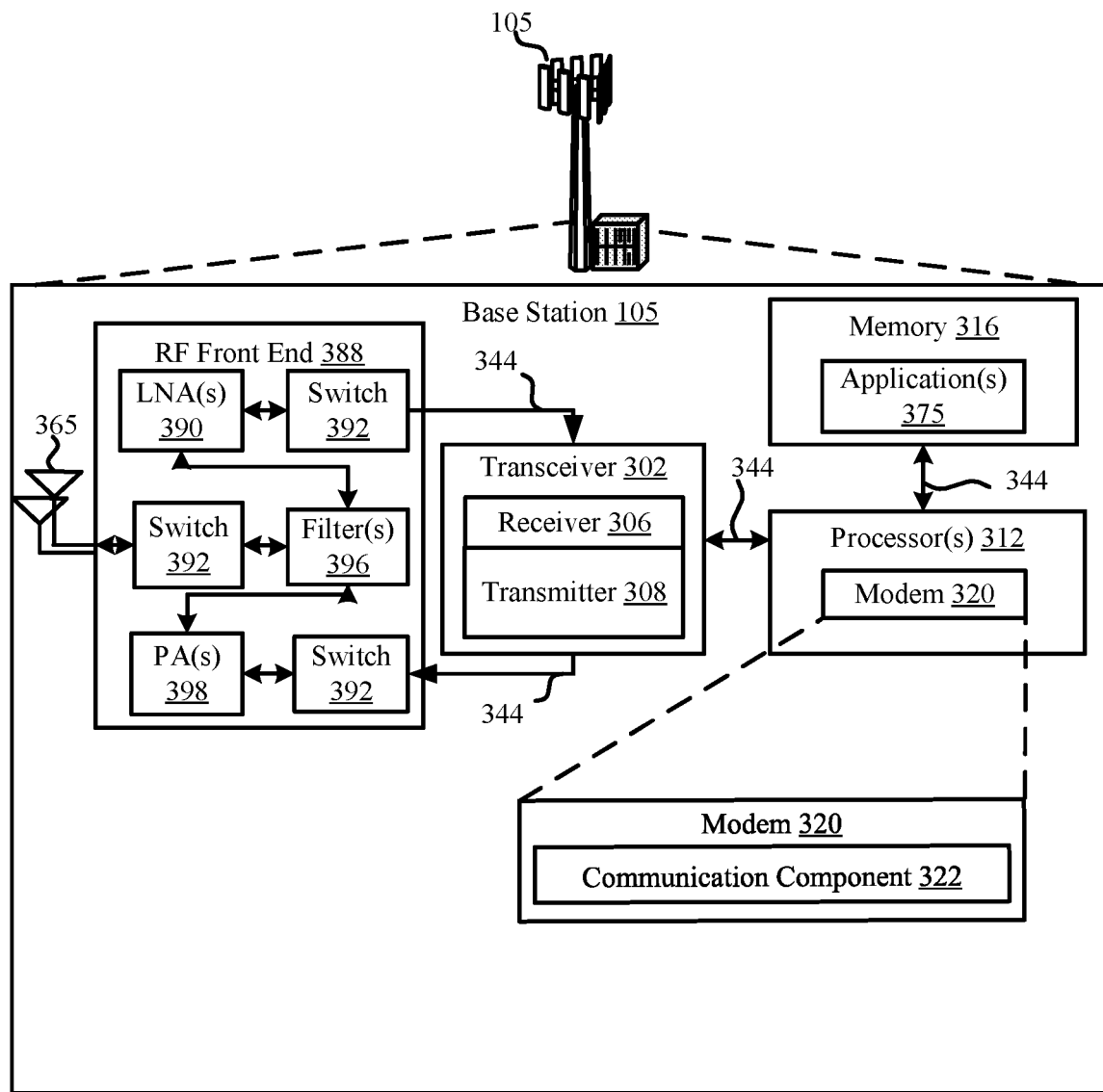
FIG. 3 is a schematic diagram of an example of a base station according to aspects of the present disclosure.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
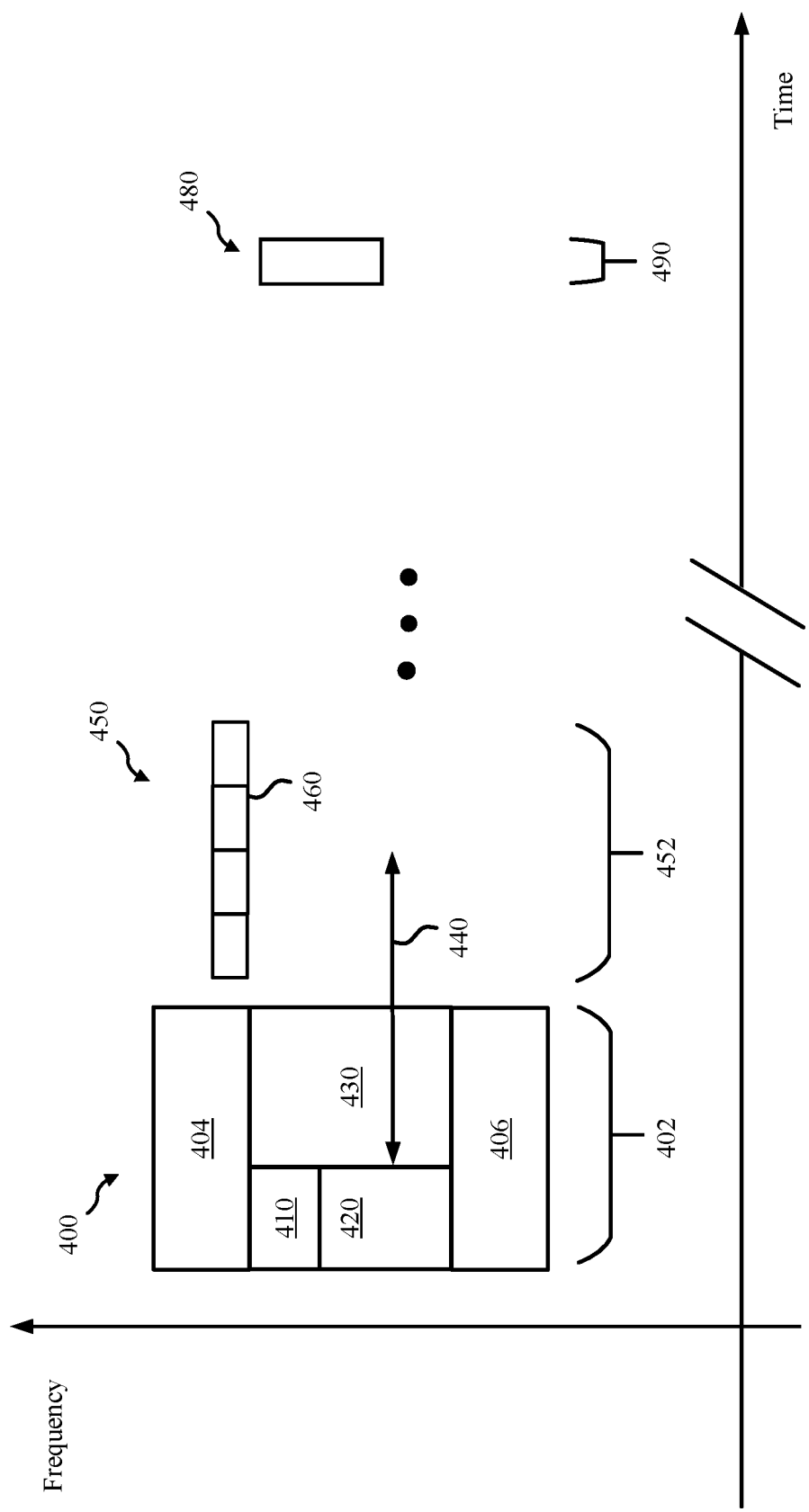
FIG. 4 illustrates an example of a slot with time division multiplexed transport blocks according to aspects of the present disclosure.

FIG. 4 illustrates an example of a slot with time division multiplexed transport blocks. In certain aspects, a transmitting UE may transmit m>1 TBs in a same slot to one or more peer UEs via sidelink channels. The m TBs may be time division multiplexed in one PSCCH/PSSCH. The m TBs may be transmitted to a peer UE or multiple peer UEs. The peer UE receiving the TBs may decode the PSCCH information in the slot and/or corresponding stage-two sidelink control information (SCI) (discussed below) to decode the data information in the PSSCH. The transmitting UE may request HARQ responses for the m TBs.

In some implementations, a slot 400 may include a low-latency TB 420, a non-low-latency TB 430, and control information 410. The slot 400 may optionally include other resources 404, 406. The slot 400 may occupy a first slot position 402. A transmitting UE, such as the UE 110, may configure the slot 400. The low-latency TB 420 may include information that is more time sensitive (should get to the peer UE faster) than the information in the non-low-latency TB 430. The control information 410 may include information to decode the low-latency TB 420 and/or the non-low-latency TB 430. In certain variations, the transmitting UE may allocate more resources to the non-low-latency TB 430 than the low-latency TB 420.

In some aspects, the transmitting UE may transmit the slot 400 to a peer UE, such as the UE 110 (e.g., truck 110). The peer UE may receive the low-latency TB 420 before the non-low-latency TB 430. The peer UE may respond with a HARQ response indicating whether the peer UE is able to decode the information in the low-latency TB 420 and/or the non-low-latency TB 430. The peer UE may transmit a first HARQ response associated with the low-latency TB 420 in a sub-slot 460 of an enhanced physical sidelink feedback channel (ePSFCH) 450. The ePSFCH 450 may be in a second slot position 452 after the first slot position 402. In one example, the second slot position 452 may be adjacent (e.g., immediately after) to the first slot position 402. The sub-slot 460 may be a number of symbols 440 after the last symbol of the low-latency TB 420. The peer UE may transmit a second HARQ response associated with the non-low-latency TB 430 in one or more physical resource blocks (PRBs) 480 of a PSFCH symbol 490.

In certain aspects of the present disclosure, the control information 410 may include one or more bits indicating that the low-latency TB 420 and the non-low-latency TB 430 may be time division multiplexed. The transmitting UE may communicate, via sidelink radio resource control (RRC) indications, such as PC5 RRC, with the intended peer UE whether the TBs are time division multiplexed. This scheme may be backward compatible with legacy reception schemes by peer UE.

Figure 5A:
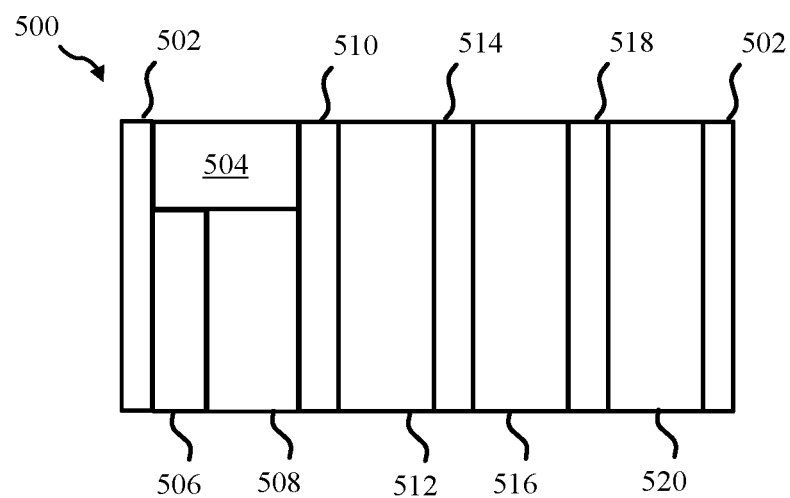
FIG. 5A illustrates a first example of state-two sidelink control information arrangements in a slot with time division multiplexed transport blocks according to aspects of the present disclosure.
Figure 5B:
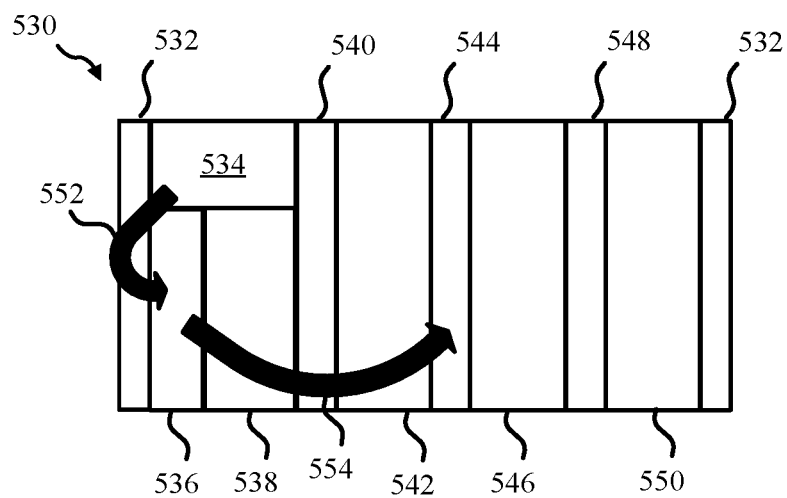
FIG. 5B illustrates a second example of state-two sidelink control information arrangements in a slot with time division multiplexed transport blocks according to aspects of the present disclosure
Figure 5C:
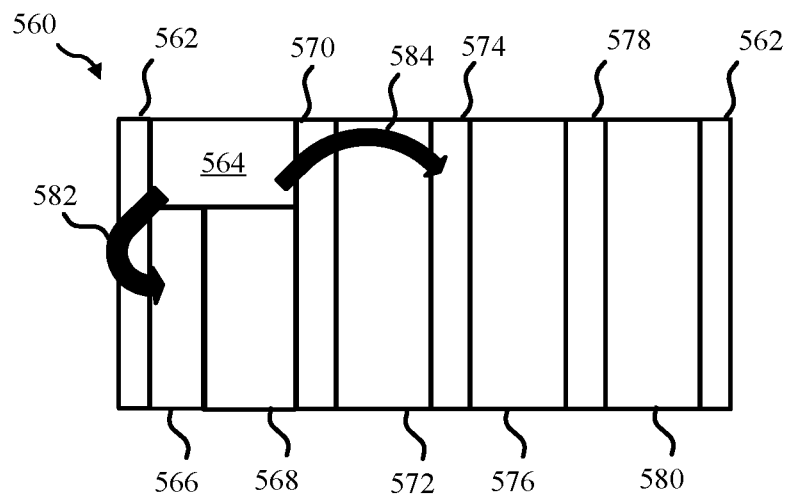
FIG. 5C illustrates a third example of state-two sidelink control information arrangements in a slot with time division multiplexed transport blocks according to aspects of the present disclosure

FIGS. 5A-5C may illustrate examples of state-two sidelink control information arrangements in a slot with time division multiplexed transport blocks. Turning to FIG. 5A, in a first aspect, a slot 500 may include control information 504, first demodulation reference signals (DMRSs) and stage-two SCI 506, a first TB 508, second DMRSs 510, a second TB 512, third DMRSs 514, a third TB 516, fourth DMRSs 518, a fourth TB 520, and remaining resources 502 (e.g., guard bands). A transmitting UE may transmit the slot 500 to one or more peer UEs. The one or more peer UEs may use the information in the control information 504 and/or the first DMRSs and stage-two SCI 506 to decode one or more of the first TB 508, the second TB 512, the third TB 516, and/or the fourth TB 520.

Turning to FIG. 5B, in a second aspect, a slot 530 may include control information 534, first DMRSs and stage-two SCI 536, a first TB 538, second DMRSs 540, a second TB 542, third DMRSs and stage-two SCI 544, a third TB 546, fourth DMRSs 548, a fourth TB 550, and remaining resources 532 (e.g., guard bands). The control information 534 may include a first pointer 552 to the stage-two SCI in the first DMRSs and stage-two SCI 536. The DMRSs and stage-two SCI 536 may include a second pointer 554 to the stage-two SCI in the third DMRSs and stage-two SCI 544. A transmitting UE may transmit the slot 530 to one or more peer UEs. The one or more peer UEs may use the information in the control information 534, the first DMRSs and stage-two SCI 536, and/or the third DMRSs and stage-two SCI 544 to decode one or more of the first TB 538, the second TB 542, the third TB 546, and/or the fourth TB 550. For example, a peer UE attempting to decode the third TB 546 may decode the control information 534 to obtain the first pointer 552 to the stage-two SCI in the first DMRSs and stage-two SCI 536. The peer UE may then decode the stage-two SCI in the first DMRSs and stage-two SCI 536 to obtain the second pointer 554 to the stage-two SCI in the third DMRSs and stage-two SCI 544. The peer UE may utilize the control information 534, the first DMRSs and stage-two SCI 536, and/or the third DMRSs and stage-two SCI 544 to decode the third TB 546. In some aspects, a cross-slot schedule (explained in further detail below) may be performed at a later TB, such as the third TB 546 and/or the fourth TB 550.

Turning to FIG. 5C, in a third aspect, a slot 560 may include control information 564, first demodulation reference signals (DMRSs) and stage-two SCI 566, a first TB 568, second DMRSs 570, a second TB 572, third DMRSs and stage-two SCI 574, a third TB 576, fourth DMRSs 578, a fourth TB 580, and remaining resources 562 (e.g., guard bands). The control information 564 may include a first pointer 582 to the stage-two SCI in the first DMRSs and stage-two SCI 566. The control information 564 may include a second pointer 584 to the stage-two SCI in the third DMRSs and stage-two SCI 574. A transmitting UE may transmit the slot 560 to one or more peer UEs. The one or more peer UEs may use the information in the control information 564, the first DMRSs and stage-two SCI 566, and/or the third DMRSs and stage-two SCI 574 to decode one or more of the first TB 568, the second TB 572, the third TB 576, and/or the fourth TB 580. For example, a peer UE attempting to decode the third TB 576 may decode the control information 564 to obtain the second pointer 584 to the stage-two SCI in the third DMRSs and stage-two SCI 574. The peer UE may utilize the control information 564 and/or the third DMRSs and stage-two SCI 574 to decode the third TB 576. In some aspects, a cross-slot schedule may be performed at any TB.

Referring to FIGS. 5A-5C, in some implementations, any of the stage-two SCIs may be mapped to contiguous PRBs. The stage-two SCIs may optionally include one or more time domain resource allocation (TDRA) fields that indicate the set or sets of contiguous symbols allocated to a corresponding TB.

In certain implementations, the transmitting UE may transmit one or more stage-two SCIs for each peer UE configured to receive the time division multiplexed TBs in the slot. When the number stage-two SCIs may be smaller than the number of TBs when multiple TBs are transmitted to a single peer UE. As a result, the number of control bits may be reduced due to reduced duplicated cyclic redundancy check (CRC) bits, level-1 (L1) source identifier (ID), and/or L1 destination ID.

Referring to FIG. 5C, if the transmitting UE transmits a single dedicated stage-two SCI to each peer UE receiving the TBs, the transmitting UE may include, in the PSCCH, a shorter (e.g., less than 16 bits) destination ID of the target peer UE, with the pointer to the dedicated stage-two SCI.

Returning to FIGS. 5A-5C, in some alternate aspects of the present disclosure, the transmitting UE may transmit a composite stage-two SCI for all the TBs in the slot. This scheme may save the number of bits used for the control information due to minimization and/or elimination of duplicate CRC and/or L1 source ID. The composite stage-two SCI may be mapped to contiguous PRBs starting from the first symbol with the first PSSCH DMRS. Alternatively or additionally, the composite stage-two SCI may be rate-matched to a PSSCH DMRS (other than the first PSSCH DMRS) specified in the PSCCH. The second rate matching scheme above may be utilized if the one or more symbols right after the first PSSCH DMRS have not been cross-slot scheduled by a previous SCI for low-latency applications.

Figure 6:
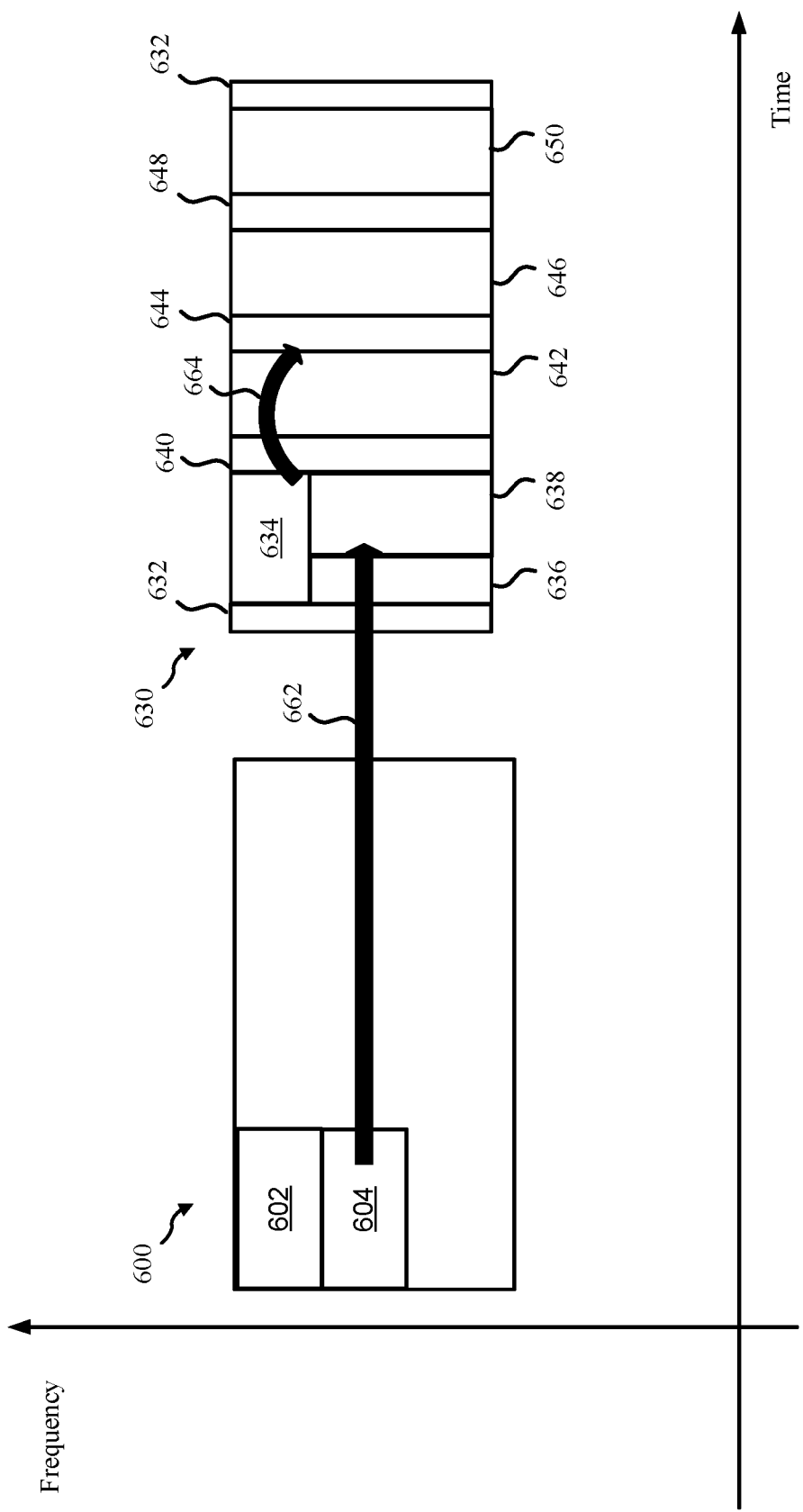
FIG. 6 illustrates an example of cross-slot scheduling according to aspects of the present disclosure.

FIG. 6 illustrates an example of cross-slot scheduling. In an implementation, a first slot 600 may include first SCI (such as a legacy SCI) 602. The first slot 600 may include a cross-slot schedule 604. The cross-slot schedule 604 may include a first pointer 662 pointing to data and/or control information of a second slot 630. The second slot 630 may include control information 634, first DMRSs and stage-two SCI 636, a first TB 638, second DMRSs 640, a second TB 642, third DMRSs and stage-two SCI 644, a third TB 646, fourth DMRSs 648, a fourth TB 650, and remaining resources 632 (e.g., guard bands). The control information 634 may include a second pointer 664 pointing to the stage-two SCI in the third DMRSs and stage-two SCI 644. In an aspect of the present disclosure, the first pointer 662 may point to the first TB 638 of the second slot 630.

Figure 7:
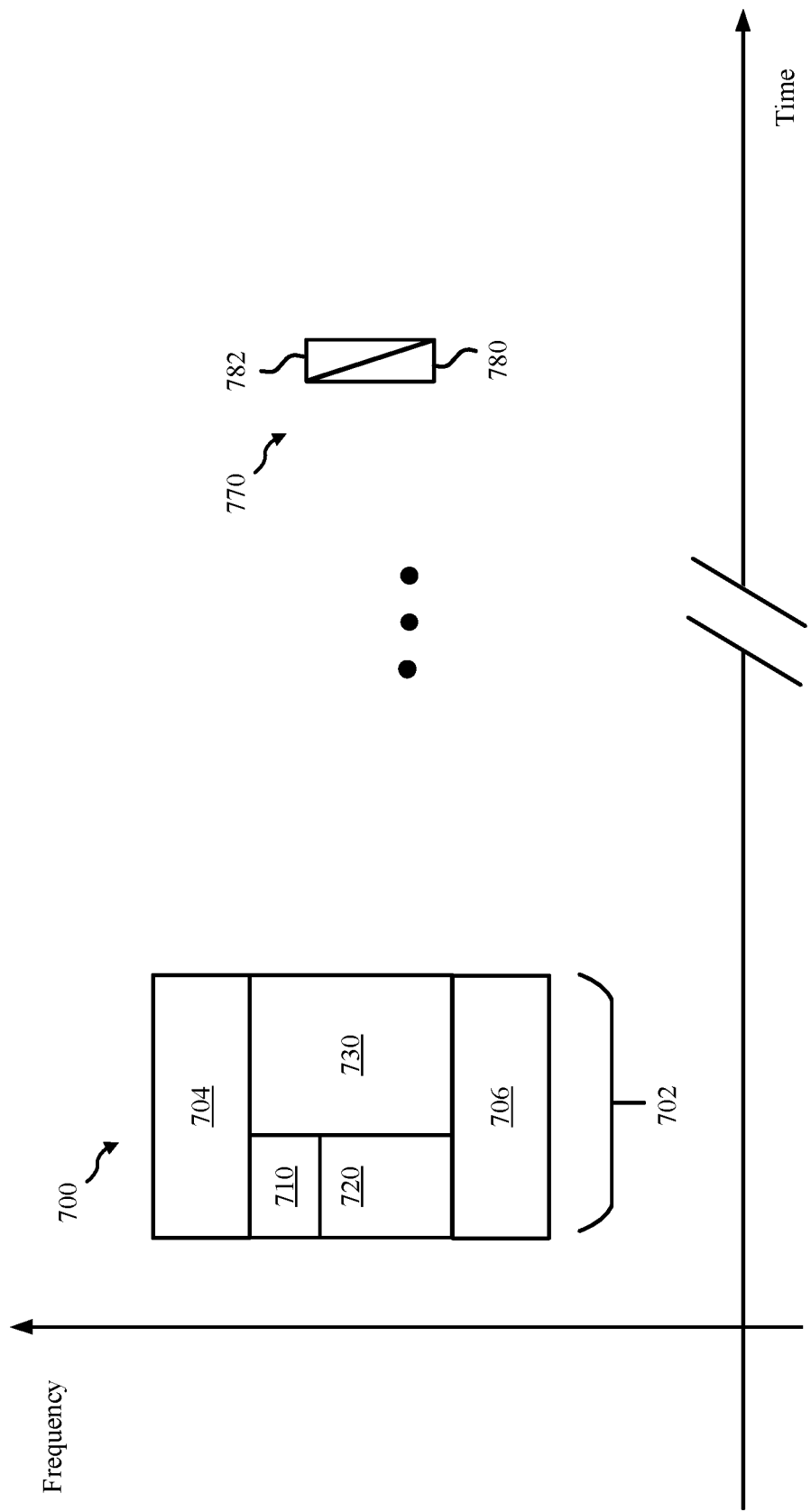
FIG. 7 illustrates a first example of configuring HARQ response for a slot with multiple time division multiplexed transport blocks according to aspects of the present disclosure.

FIG. 7 illustrates a first example of configuring HARQ response for a slot with multiple time division multiplexed transport blocks. A transmitting UE may transmit a slot with multiple time division multiplexed TBs to more than one peer UEs. Each peer UE may receive a different TB. Each peer UE may utilize a time domain index, S, to compute the resource used for a HARQ response to the transmitted TB. In some aspects of the present disclosure, the peer UEs may calculate (e.g., using a hash function) the PSFCH resource index using the equation $(K+M+S) \mod(Z*Y)$, where K is the L1 source ID, M is the member ID of groupcast option 2 (0 otherwise), $(Z*Y)$ is the size of the hashing space (Z PRBs per sub-channel and Y cyclic shifts per PRB), and S is the time domain index.

In some implementations, a slot 700 may include a first TB 720, a second TB 730, and control information 710. The slot 700 may optionally include other resources 704, 706. The slot 700 may occupy a first slot position 702. A transmitting UE, such as the UE 110, may configure the slot 700. The first TB 720 may include information that is more time sensitive (should get to the peer UE faster) than the information in the second TB 730. The control information 710 may include information to decode the first TB 720 and/or the second TB 730.

In some aspects, the transmitting UE may transmit the slot 700 to a first peer UE and a second peer UE. The first peer UE may receive the first TB 720 and the second peer UE may receive the second TB 730. The peer UEs may respond with HARQ responses indicating whether the peer UEs are able to decode the information in the first TB 720 and/or the second TB 730. The peer UEs may calculate the resources used for the HARQ responses based on the aspects described above. The first peer UE may transmit a first HARQ response associated with the first TB 720 in a first portion 780 of a PSFCH symbol 770. The second peer UE may transmit a second HARQ response associated with the second TB 730 in a second portion 782 of the PSFCH symbol 770. For the first TB 720, the first peer UE may use S=0. For the second TB 730, the second peer UE may use S=1, and so forth and so on.

Figure 8:
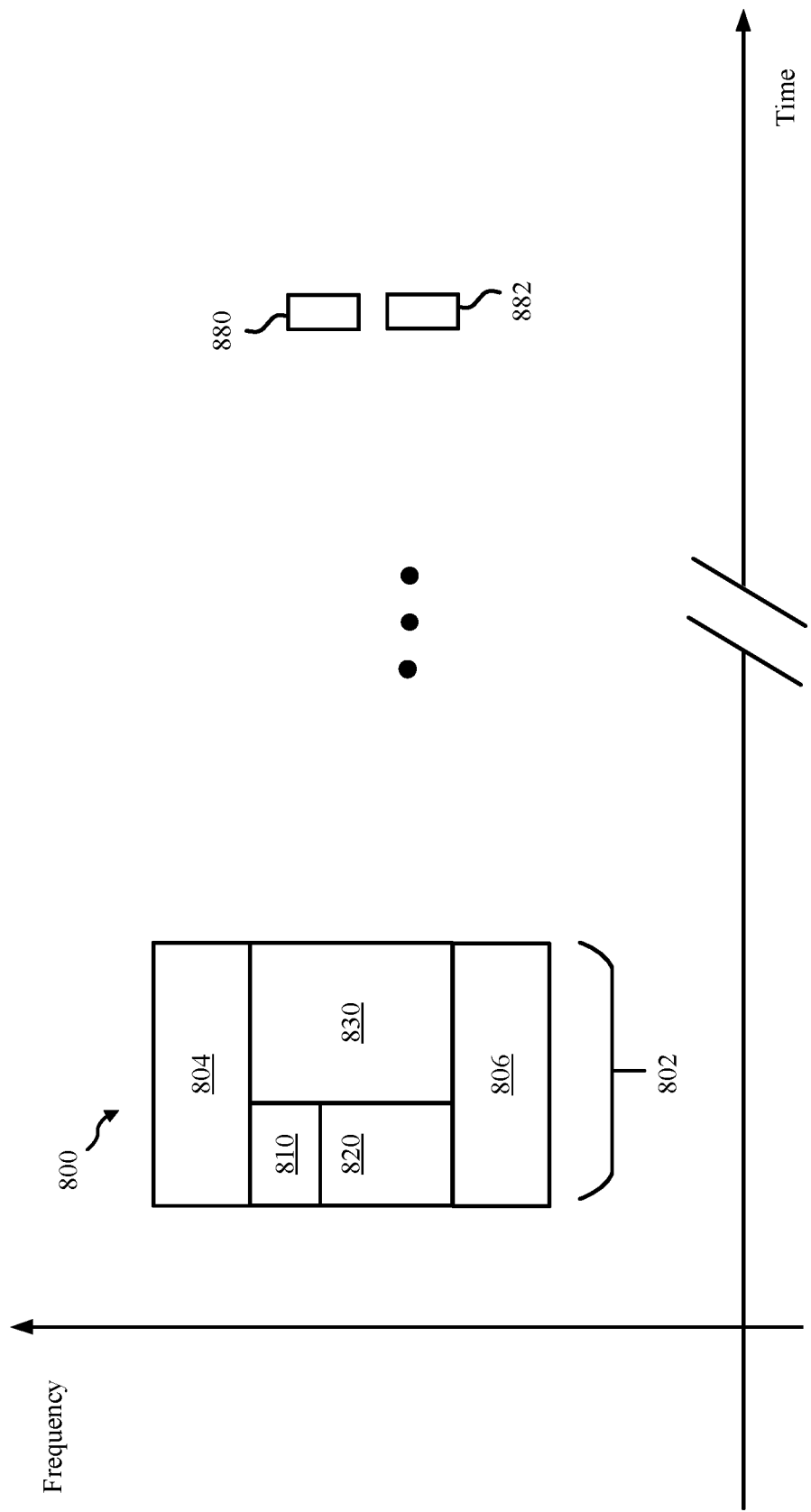
FIG. 8 illustrates a second example of configuring HARQ response for a slot with multiple time division multiplexed transport blocks according to aspects of the present disclosure.

FIG. 8 illustrates a second example of configuring HARQ response for a slot with multiple time division multiplexed transport blocks. In some implementations, when the PSSCH carrying m TBs occupies L≥m sub-channels, the HARQ responses may be arranged to the respective PSFCH resources corresponding to different sub-channels.

In some implementations, a slot 800 may include a first TB 820, a second TB 830, and control information 810. The slot 800 may optionally include other resources 804, 806. The slot 800 may occupy a first slot position 802. A transmitting UE, such as the UE 110, may configure the slot 800. The first TB 820 may include information that is more time sensitive (should get to the peer UE faster) than the information in the second TB 830. The control information 810 may include information to decode the first TB 820 and/or the second TB 830.

In some aspects, the transmitting UE may transmit the slot 800 to a first peer UE and a second peer UE. The first peer UE may receive the first TB 820 and the second peer UE may receive the second TB 830. The peer UEs may respond with HARQ responses indicating whether the peer UEs are able to decode the information in the first TB 820 and/or the second TB 830. The first peer UE may transmit a first HARQ response associated with the first TB 820 in a first PRB 880 associated with a first sub-channel. The second peer UE may transmit a second HARQ response associated with the second TB 830 in a second PRB 882 associated with a second sub-channel.

Figure 9:
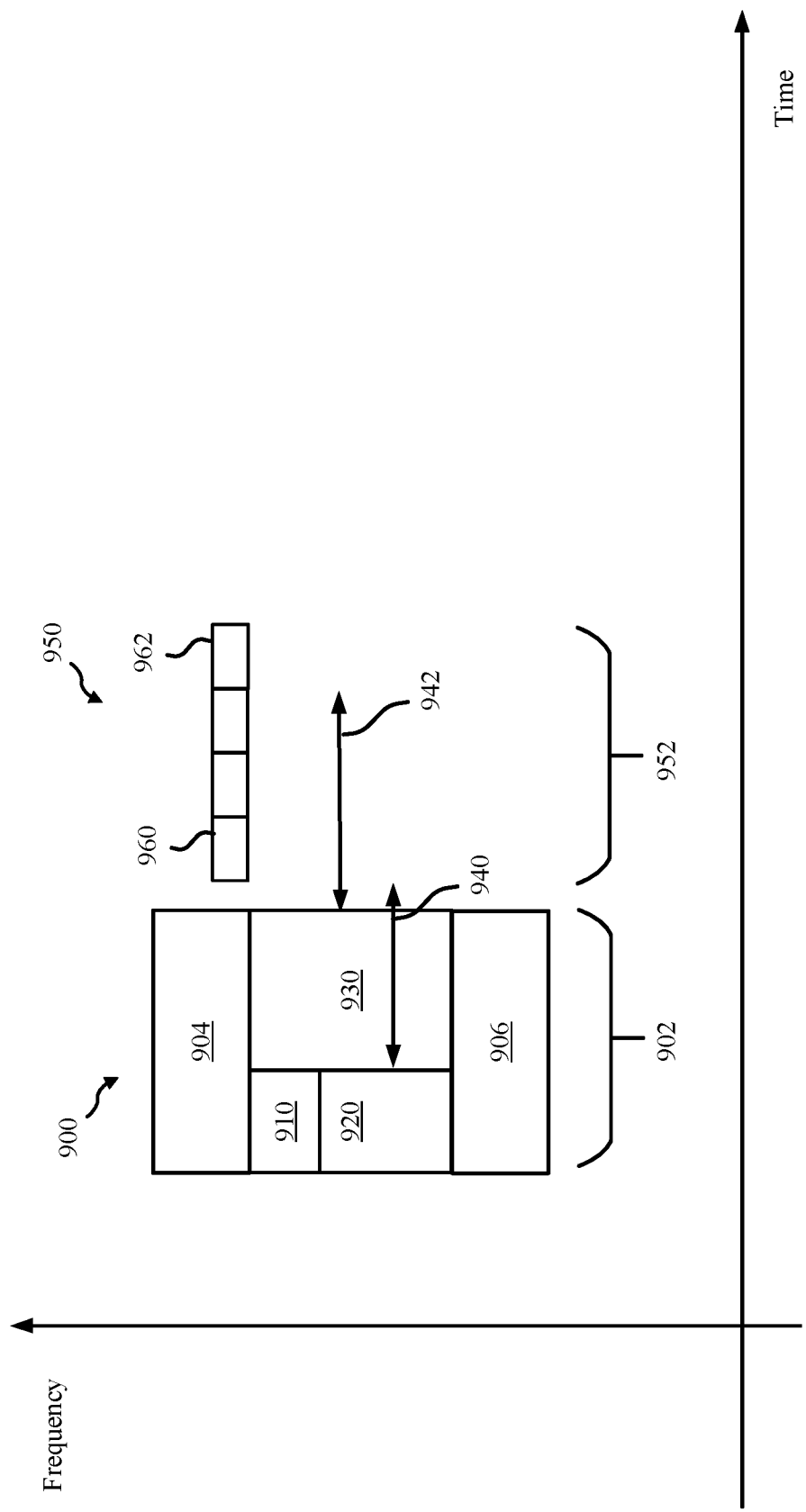
FIG. 9 illustrates a third example of configuring HARQ response for a slot with multiple time division multiplexed transport blocks according to aspects of the present disclosure.

FIG. 9 illustrates a third example of configuring HARQ response for a slot with multiple time division multiplexed transport blocks. In some implementations, multiple time division multiplexed TBs in a single slot may be assigned with fast HARQ responses over ePSFCH. For example, two HARQ response (associated with two time division multiplexed TBs in a single slot) may be separated temporally (no time domain collision) in a single ePSFCH. Alternatively or additionally, the HARQ responses may be code division multiplexed using the time domain index S into the hashing function (described above).

In some implementations, a slot 900 may include a first TB 920, a second TB 930, and control information 910. The slot 900 may optionally include other resources 904, 906. The slot 900 may occupy a first slot position 902. A transmitting UE, such as the UE 110, may configure the slot 900. The first TB 920 may include information that is more time sensitive (should get to the peer UE faster) than the information in the second TB 930. The control information 910 may include information to decode the first TB 920 and/or the second TB 930.

In some aspects, the transmitting UE may transmit the slot 900 to two or more peer UEs, such as the UEs 110 if FIG. 1. The first peer UE may receive the first TB 920 and the second peer UE may receive the second TB 930. The peer UEs may respond with a HARQ response indicating whether the peer UEs are able to decode the information in the first TB 920 and/or the second TB 930. The first peer UE may transmit a first HARQ response associated with the first TB 920 in a first sub-slot 960 of an ePSFCH 950. The second peer UE may transmit a second HARQ response associate with the second TB 930 in a second sub-slot 962 of the ePSFCH 950. The ePSFCH 950 may be in a second slot position 952 after the first slot position 902. In one example, the second slot position 952 may be adjacent (e.g., immediately after) to the first slot position 902. The first sub-slot 960 may be a first number of symbols 940 after the last symbol of the first TB 920. The second sub-slot 962 may be a second number of symbols 942 after the last symbol of the second TB 930. The first number of symbols 940 and the second number of symbols 942 may be the same or different.

Figure 10:
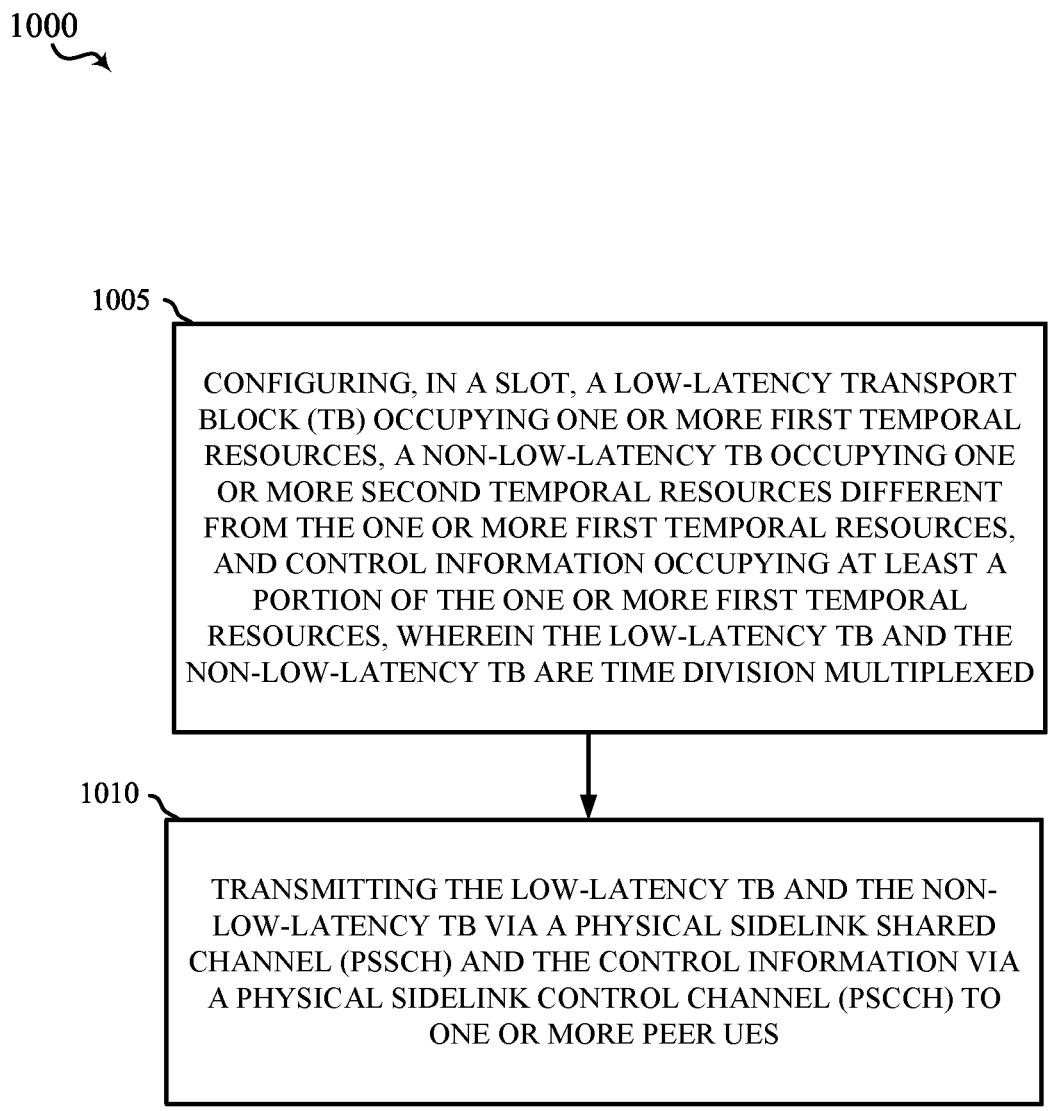
FIG. 10 illustrates an example of a method for transmitting time division multiplexed transport blocks according to aspects of the present disclosure.

FIG. 10 illustrates an example of a method for transmitting time division multiplexed transport blocks. For example, a method 1000 may be performed by the one or more of the processor 212, the memory 216, the applications 275, the modem 220, the transceiver 202, the receiver 206, the transmitter 208, the RF front end 288, the communication component 222, the configuration component 224, and/or the decoding component 226, and/or one or more other components of the UE 110 (i.e., transmitting UE 110) in the wireless communication network 100.

At block 1005, the method 1000 may configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed. For example, the configuration component 224, the processor 212, the memory 216, the modem 220, and/or the applications 275 of the UE 110 may configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed as described above.

In certain implementations, the configuration component 224, the processor 212, the memory 216, the modem 220, and/or the applications 275 may be configured to and/or may define means for configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed.

At block 1010, the method 1000 may transmit the low-latency TB and the non-low-latency TB via a physical sidelink shared channel (PSSCH) and the control information via a physical sidelink control channel (PSCCH) to one or more peer UEs. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit the low-latency TB and the non-low-latency TB via a physical sidelink shared channel (PSSCH) and the control information via a physical sidelink control channel (PSCCH) to one or more peer UEs as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electromagnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting the low-latency TB and the non-low-latency TB via a physical sidelink shared channel (PSSCH) and the control information via a physical sidelink control channel (PSCCH) to one or more peer UEs.

Alternatively or additionally, the method 1000 may further include any of the methods above, further comprising configuring a first stage-two sidelink control information (SCI) within the one or more first temporal resources and a second stage-two SCI within the one or more second temporal resources.

Alternatively or additionally, the method 1000 may further include any of the methods above, wherein the control information includes a first pointer to the first stage-two SCI, and the first stage-two SCI includes a second pointer to the second stage-two SCI.

Alternatively or additionally, the method 1000 may further include any of the methods above, wherein the control information includes a first pointer to the first stage-two SCI and a second pointer to the second stage-two SCI.

Alternatively or additionally, the method 1000 may further include any of the methods above, wherein the first stage-two SCI includes a first time domain resource allocation (TDRA) field indicating a first set of contiguous symbols allocated to the low-latency TB, and the second stage-two SCI includes a second TDRA field indicating a second set of contiguous symbols allocated to the non-low-latency TB.

Alternatively or additionally, the method 1000 may further include any of the methods above, wherein the control information or the second stage-two SCI includes cross-slot schedule information for a subsequent slot after the slot.

Alternatively or additionally, the method 1000 may further include any of the methods above, wherein transmitting the low-latency TB and the non-low-latency TB comprises transmitting the low-latency TB and the non-low-latency TB to a single peer UE of the one or more peer UEs, and configuring a stage-two sidelink control information (SCI) for the low-latency TB and the non-low-latency TB, and transmitting the stage-two SCI to the single peer UE.

Alternatively or additionally, the method 1000 may further include any of the methods above, wherein the control information includes a reduced length destination identification of the single peer UE and a pointer to the stage-two SCI.

Alternatively or additionally, the method 1000 may further include any of the methods above, further comprising configuring a composite stage-two sidelink control information (SCI) for the low-latency TB and the non-low-latency TB.

Alternatively or additionally, the method 1000 may further include any of the methods above, wherein the composite stage-two SCI is rate matched to a first symbol with a first PSSCH demodulation reference signal (DMRS) or a PSSCH DMRS different from the first PSSCH DMRS.

Alternatively or additionally, the method 1000 may further include any of the methods above, wherein the control information includes an indicator indicating that the low-latency TB and the non-low-latency TB are time division multiplexed.

FIG. 11 illustrates an example of a method for transmitting a HARQ response to time division multiplexed transport blocks. For example, a method 1100 may be performed by the one or more of the processor 212, the memory 216, the applications 275, the modem 220, the transceiver 202, the receiver 206, the transmitter 208, the RF front end 288, the communication component 222, the configuration component 224, and/or the decoding component 226, and/or one or more other components of the UE 110 (i.e., the peer UE) in the wireless communication network 100.

At block 1105, the method 1100 may receive, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed as described above.

In certain implementations, the communication component 222, the transceiver 202, the receiver 206, the transmitter 208, the RF front end 288, the subcomponents of the RF front end 288, the processor 212, the memory 216, the modem 220, and/or the applications 275 of the UE 110 may be configured to and/or may define means for receiving, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed.

At block 1110, the method 1100 may decode one or more of the low-latency TB or the non-low-latency TB identified in the control information for the peer UE. For example, the decoding component 226, the processor 212, the memory 216, the modem 220, and/or the applications 275 of the UE 110 may decode one or more of the low-latency TB or the non-low-latency TB identified in the control information for the peer UE as described above.

In certain implementations, the decoding component 226, the processor 212, the memory 216, the modem 220, and/or the applications 275 may be configured to and/or may define means for decoding one or more of the low-latency TB or the non-low-latency TB identified in the control information for the peer UE.

Alternatively or additionally, the method 1100 may further comprise calculating one or more physical sidelink feedback channel (PSFCH) indices using an equation $(K+M+S)\bmod(Z*Y)$, where K is a level 1 (L1) source identifier (ID), M is a member ID of a groupcast option, S is one or more time domain shift indices, Z is a number of physical resource blocks (PRBs) per sub-channel, and Y is a cyclic shift per PRB and transmitting a hybrid automatic repeat request (HARQ) response indicating successfully decoding or failed decoding of the one or more of the low-latency TB or the non-low-latency TB, wherein one or more resources for the HARQ response is indicated by the PSFCH indices.

Alternatively or additionally, the method 1100 may further comprise configuring, in a physical sidelink feedback channel (PSFCH) symbol, at least one of a first frequency resource for a first hybrid automatic repeat request (HARQ) response associated with the low-latency TB or a second frequency for a second HARQ response associated with the non-low-latency TB and transmitting the at least one of the first HARQ response or the second HARQ response.

Alternatively or additionally, the method 1100 may further comprise configuring at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is one or more symbols after a last symbol of the one or more first temporal resources or a second HARQ resource, in a PSFCH symbol, for a second HARQ response associated with the non-low-latency TB, and transmitting the at least one of the first HARQ response or the second HARQ response.

Alternatively or additionally, the method 1100 may further comprise configuring at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is $k_1$ symbols after a last symbol of the one or more first temporal resources or a second HARQ resource, in the ePSFCH resource in the subsequent slot, for a second HARQ response associated with the non-low-latency TB, wherein a second symbol of the second HARQ resource is $k_2$ symbols after a last symbol of the one or more second temporal resources, and transmitting the at least one of the first HARQ response or the second HARQ response.

Additional Implementations

Aspects of the present disclosure include methods by a user equipment (UE) for configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmitting the low-latency TB and the non-low-latency TB via a physical sidelink shared channel (PSSCH) and the control information via a physical sidelink control channel (PSCCH) to one or more peer UEs.

Any of the methods above, further comprising configuring a first stage-two sidelink control information (SCI) within the one or more first temporal resources and a second stage-two SCI within the one or more second temporal resources.

Any of the methods above, wherein the control information includes a first pointer to the first stage-two SCI, and the first stage-two SCI includes a second pointer to the second stage-two SCI.

Any of the methods above, wherein the control information includes a first pointer to the first stage-two SCI and a second pointer to the second stage-two SCI.

Any of the methods above, wherein the first stage-two SCI includes a first time domain resource allocation (TDRA) field indicating a first set of contiguous symbols allocated to the low-latency TB, and the second stage-two SCI includes a second TDRA field indicating a second set of contiguous symbols allocated to the non-low-latency TB.

Any of the methods above, wherein the control information or the second stage-two SCI includes cross-slot schedule information for a subsequent slot after the slot.

Any of the methods above, wherein transmitting the low-latency TB and the non-low-latency TB comprises transmitting the low-latency TB and the non-low-latency TB to a single peer UE of the one or more peer UEs, and configuring a stage-two sidelink control information (SCI) for the low-latency TB and the non-low-latency TB, and transmitting the stage-two SCI to the single peer UE.

Any of the methods above, wherein the control information includes a reduced length destination identification of the single peer UE and a pointer to the stage-two SCI.

Any of the methods above, further comprising configuring a composite stage-two sidelink control information (SCI) for the low-latency TB and the non-low-latency TB.

Any of the methods above, wherein the composite stage-two SCI is rate matched to a first symbol with a first PSSCH demodulation reference signal (DMRS) or a PSSCH DMRS different from the first PSSCH DMRS.

Any of the methods above, wherein the control information includes an indicator indicating that the low-latency TB and the non-low-latency TB are time division multiplexed.

Other aspects of the present disclosure include a user equipment (UE) having a memory comprising instructions, a transceiver, and one or more processors operatively coupled with the memory and the transceiver, the one or more processors configured to execute instructions in the memory to configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmit the low-latency TB and the non-low-latency TB via a physical sidelink shared channel (PSSCH) and the control information via a physical sidelink control channel (PSCCH) to one or more peer UEs.

Any of the UEs above, wherein the one or more processors are further configured to configure a first stage-two sidelink control information (SCI) within the one or more first temporal resources and a second stage-two SCI within the one or more second temporal resources.

Any of the UEs above, wherein the control information includes a first pointer to the first stage-two SCI, and the first stage-two SCI includes a second pointer to the second stage-two SCI.

Any of the UEs above, wherein the control information includes a first pointer to the first stage-two SCI and a second pointer to the second stage-two SCI.

Any of the UEs above, wherein the first stage-two SCI includes a first time domain resource allocation (TDRA) field indicating a first set of contiguous symbols allocated to the low-latency TB, and the second stage-two SCI includes a second TDRA field indicating a second set of contiguous symbols allocated to the non-low-latency TB.

Any of the UEs above, wherein the control information or the second stage-two SCI includes cross-slot schedule information for a subsequent slot after the slot.

Any of the UEs above, wherein the one or more processors are further configured to transmit the low-latency TB and the non-low-latency TB to a single peer UE of the one or more peer UEs, and configure a stage-two sidelink control information (SCI) for the low-latency TB and the non-low-latency TB, and transmit the stage-two SCI to the single peer UE.

Any of the UEs above, wherein the control information includes a reduced length destination identification of the single peer UE and a pointer to the stage-two SCI.

Any of the UEs above, wherein the one or more processors are further configured to configure a composite stage-two sidelink control information (SCI) for the low-latency TB and the non-low-latency TB.

Any of the UEs above, wherein the composite stage-two SCI is rate matched to a first symbol with a first PSSCH demodulation reference signal (DMRS) or a PSSCH DMRS different from the first PSSCH DMRS.

Any of the UEs above, wherein the control information includes an indicator indicating that the low-latency TB and the non-low-latency TB are time division multiplexed.

An aspect of the present disclosure includes a user equipment (UE) including means for configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and means for transmitting the low-latency TB and the non-low-latency TB via a physical sidelink shared channel (PSSCH) and the control information via a physical sidelink control channel (PSCCH) to one or more peer UEs.

Any of the UEs above, further comprising means for configuring a first stage-two sidelink control information (SCI) within the one or more first temporal resources and a second stage-two SCI within the one or more second temporal resources.

Any of the UEs above, wherein the control information includes a first pointer to the first stage-two SCI, and the first stage-two SCI includes a second pointer to the second stage-two SCI.

Any of the UEs above, wherein the control information includes a first pointer to the first stage-two SCI and a second pointer to the second stage-two SCI.

Any of the UEs above, wherein the first stage-two SCI includes a first time domain resource allocation (TDRA) field indicating a first set of contiguous symbols allocated to the low-latency TB, and the second stage-two SCI includes a second TDRA field indicating a second set of contiguous symbols allocated to the non-low-latency TB.

Any of the UEs above, wherein the control information or the second stage-two SCI includes cross-slot schedule information for a subsequent slot after the slot.

Any of the UEs above, wherein means for transmitting the low-latency TB and the non-low-latency TB comprises means for transmitting the low-latency TB and the non-low-latency TB to a single peer UE of the one or more peer UEs, and further comprises means for configuring a stage-two sidelink control information (SCI) for the low-latency TB and the non-low-latency TB, and means for transmitting the stage-two SCI to the single peer UE.

Any of the UEs above, wherein the control information includes a reduced length destination identification of the single peer UE and a pointer to the stage-two SCI.

Any of the UEs above, further comprising means for configuring a composite stage-two sidelink control information (SCI) for the low-latency TB and the non-low-latency TB.

Any of the UEs above, wherein the composite stage-two SCI is rate matched to a first symbol with a first PSSCH demodulation reference signal (DMRS) or a PSSCH DMRS different from the first PSSCH DMRS.

Any of the UEs above, wherein the control information includes an indicator indicating that the low-latency TB and the non-low-latency TB are time division multiplexed.

Some aspects of the present disclosure include non-transitory computer readable media having instructions stored therein that, when executed by one or more processors of a user equipment (UE), cause the one or more processors to configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed, and transmit the low-latency TB and the non-low-latency TB via a physical sidelink shared channel (PSSCH) and the control information via a physical sidelink control channel (PSCCH) to one or more peer UEs.

Any of the non-transitory computer readable media above, further comprising instructions, when executed by the one or more processors, cause the one or more processors to configure a first stage-two sidelink control information (SCI) within the one or more first temporal resources and a second stage-two SCI within the one or more second temporal resources.

Any of the non-transitory computer readable media above, wherein the control information includes a first pointer to the first stage-two SCI, and the first stage-two SCI includes a second pointer to the second stage-two SCI.

Any of the non-transitory computer readable media above, wherein the control information includes a first pointer to the first stage-two SCI and a second pointer to the second stage-two SCI.

Any of the non-transitory computer readable media above, wherein the first stage-two SCI includes a first time domain resource allocation (TDRA) field indicating a first set of contiguous symbols allocated to the low-latency TB, and the second stage-two SCI includes a second TDRA field indicating a second set of contiguous symbols allocated to the non-low-latency TB.

Any of the non-transitory computer readable media above, wherein the control information or the second stage-two SCI includes cross-slot schedule information for a subsequent slot after the slot.

Any of the non-transitory computer readable media above, wherein the instructions for transmitting the low-latency TB and the non-low-latency TB comprises further comprising instructions to transmit the low-latency TB and the non-low-latency TB to a single peer UE of the one or more peer UEs, and configure a stage-two sidelink control information (SCI) for the low-latency TB and the non-low-latency TB, and transmit the stage-two SCI to the single peer UE.

Any of the non-transitory computer readable media above, wherein the control information includes a reduced length destination identification of the single peer UE and a pointer to the stage-two SCI.

Any of the non-transitory computer readable media above, further comprising instructions, when executed by the one or more processors, cause the one or more processors to configure a composite stage-two sidelink control information (SCI) for the low-latency TB and the non-low-latency TB.

Any of the non-transitory computer readable media above, wherein the composite stage-two SCI is rate matched to a first symbol with a first PSSCH demodulation reference signal (DMRS) or a PSSCH DMRS different from the first PSSCH DMRS.

Any of the non-transitory computer readable media above, wherein the control information includes an indicator indicating that the low-latency TB and the non-low-latency TB are time division multiplexed.

Aspects of the present disclosure include methods by a user equipment (UE) for receiving, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and decoding one or more of the low-latency TB or the non-low-latency TB identified in the control information for the peer UE.

The method above, further comprises calculating one or more physical sidelink feedback channel (PSFCH) indices using an equation $(K+M+S) \bmod(Z*Y)$, where K is a level 1 (L1) source identifier (ID), M is a member ID of a groupcast option, S is one or more time domain shift indices, Z is a number of physical resource blocks (PRBs) per sub-channel, and Y is a cyclic shift per PRB and transmitting a hybrid automatic repeat request (HARQ) response indicating successfully decoding or failed decoding of the one or more of the low-latency TB or the non-low-latency TB, wherein one or more resources for the HARQ response is indicated by the PSFCH indices.

Any of the methods above, further comprises configuring, in a physical sidelink feedback channel (PSFCH) symbol, at least one of a first frequency resource for a first hybrid automatic repeat request (HARQ) response associated with the low-latency TB or a second frequency for a second HARQ response associated with the non-low-latency TB and transmitting the at least one of the first HARQ response or the second HARQ response.

Any of the methods above, further comprises configuring at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is one or more symbols after a last symbol of the one or more first temporal resources or a second HARQ resource, in a PSFCH symbol, for a second HARQ response associated with the non-low-latency TB, and transmitting the at least one of the first HARQ response or the second HARQ response.

Any of the methods above, further comprises configuring at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is $k_1$ symbols after a last symbol of the one or more first temporal resources or a second HARQ resource, in the ePSFCH resource in the subsequent slot, for a second HARQ response associated with the non-low-latency TB, wherein a second symbol of the second HARQ resource is $k_2$ symbols after a last symbol of the one or more second temporal resources, and transmitting the at least one of the first HARQ response or the second HARQ response.

Other aspects of the present disclosure include a user equipment (UE) having a memory comprising instructions, a transceiver, and one or more processors operatively coupled with the memory and the transceiver, the one or more processors configured to execute instructions in the memory to receive, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and decode one or more of the low-latency TB or the non-low-latency TB identified in the control information for the peer UE.

The UE above, wherein the one or more processors is configured to calculate one or more physical sidelink feedback channel (PSFCH) indices using an equation (K+M+S) mod(Z*Y), where K is a level 1 (L1) source identifier (ID), M is a member ID of a groupcast option, S is one or more time domain shift indices, Z is a number of physical resource blocks (PRBs) per sub-channel, and Y is a cyclic shift per PRB and transmit a hybrid automatic repeat request (HARQ) response indicating successfully decoding or failed decoding of the one or more of the low-latency TB or the non-low-latency TB, wherein one or more resources for the HARQ response is indicated by the PSFCH indices.

Any of the UEs above, wherein the one or more processors is configured to configure, in a physical sidelink feedback channel (PSFCH) symbol, at least one of a first frequency resource for a first hybrid automatic repeat request (HARQ) response associated with the low-latency TB or a second frequency for a second HARQ response associated with the non-low-latency TB and transmit the at least one of the first HARQ response or the second HARQ response.

Any of the UEs above, wherein the one or more processors is configured to configure at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is one or more symbols after a last symbol of the one or more first temporal resources or a second HARQ resource, in a PSFCH symbol, for a second HARQ response associated with the non-low-latency TB, and transmit the at least one of the first HARQ response or the second HARQ response.

Any of the UEs above, wherein the one or more processors is configured to configure at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is $k_1$ symbols after a last symbol of the one or more first temporal resources or a second HARQ resource, in the ePSFCH resource in the subsequent slot, for a second HARQ response associated with the non-low-latency TB, wherein a second symbol of the second HARQ resource is $k_2$ symbols after a last symbol of the one or more second temporal resources, and transmit the at least one of the first HARQ response or the second HARQ response.

An aspect of the present disclosure includes a user equipment (UE) including means for receiving, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and means for decoding one or more of the low-latency TB or the non-low-latency TB identified in the control information for the peer UE.

The UE above, further comprises means for calculating one or more physical sidelink feedback channel (PSFCH) indices using an equation (K+M+S)mod(Z*Y), where K is a level 1 (L1) source identifier (ID), M is a member ID of a groupcast option, S is one or more time domain shift indices, Z is a number of physical resource blocks (PRBs) per sub-channel, and Y is a cyclic shift per PRB and means for transmitting a hybrid automatic repeat request (HARQ) response indicating successfully decoding or failed decoding of the one or more of the low-latency TB or the non-low-latency TB, wherein one or more resources for the HARQ response is indicated by the PSFCH indices.

Any of the UEs above, further comprises means for configuring, in a physical sidelink feedback channel (PSFCH) symbol, at least one of a first frequency resource for a first hybrid automatic repeat request (HARQ) response associated with the low-latency TB or a second frequency for a second HARQ response associated with the non-lowlatency TB and means for transmitting the at least one of the first HARQ response or the second HARQ response.

Any of the UEs above, further comprises means for configuring at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is one or more symbols after a last symbol of the one or more first temporal resources or a second HARQ resource, in a PSFCH symbol, for a second HARQ response associated with the non-low-latency TB, and means for transmitting the at least one of the first HARQ response or the second HARQ response.

Any of the UEs above, further comprises means for configuring at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is $k_1$ symbols after a last symbol of the one or more first temporal resources or a second HARQ resource, in the ePSFCH resource in the subsequent slot, for a second HARQ response associated with the non-low-latency TB, wherein a second symbol of the second HARQ resource is $k_2$ symbols after a last symbol of the one or more second temporal resources, and means for transmitting the at least one of the first HARQ response or the second HARQ response.

Some aspects of the present disclosure include non-transitory computer readable media having instructions stored therein that, when executed by one or more processors of a user equipment (UE), cause the one or more processors to receive, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed and decode one or more of the low-latency TB or the non-low-latency TB identified in the control information for the peer UE.

The non-transitory computer readable media above, further comprising instructions to configure calculate one or more physical sidelink feedback channel (PSFCH) indices using an equation (K+M+S)mod(Z*Y), where K is a level 1 (L1) source identifier (ID), M is a member ID of a groupcast option, S is one or more time domain shift indices, Z is a number of physical resource blocks (PRBs) per sub-channel, and Y is a cyclic shift per PRB and transmit a hybrid automatic repeat request (HARQ) response indicating successfully decoding or failed decoding of the one or more of the low-latency TB or the non-low-latency TB, wherein one or more resources for the HARQ response is indicated by the PSFCH indices.

Any of the non-transitory computer readable media above, further comprising instructions to configure, in a physical sidelink feedback channel (PSFCH) symbol, at least one of a first frequency resource for a first hybrid automatic repeat request (HARQ) response associated with the low-latency TB or a second frequency for a second HARQ response associated with the non-low-latency TB and transmit the at least one of the first HARQ response or the second HARQ response.

Any of the non-transitory computer readable media above, further comprising instructions to configure at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is one or more symbols after a last symbol of the one or more first temporal resources or a second HARQ resource, in a PSFCH symbol, for a second HARQ response associated with the non-low-latency TB, and transmit the at least one of the first HARQ response or the second HARQ response.

Any of the non-transitory computer readable media above, further comprising instructions to configure at least one of a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is $k_1$ symbols after a last symbol of the one or more first temporal resources or a second HARQ resource, in the ePSFCH resource in the subsequent slot, for a second HARQ response associated with the non-low-latency TB, wherein a second symbol of the second HARQ resource is $k_2$ symbols after a last symbol of the one or more second temporal resources, and transmit the at least one of the first HARQ response or the second HARQ response.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
   configuring, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed; and
   transmitting the low-latency TB and the non-low-latency TB via a physical sidelink shared channel (PSSCH) and the control information via a physical sidelink control channel (PSCCH) to one or more peer UEs.

2. The method of claim 1, further comprising:
   configuring a first stage-two sidelink control information (SCI) within the one or more first temporal resources and a second stage-two SCI within the one or more second temporal resources.

3. The method of claim 2, wherein:
   the control information includes a first pointer to the first stage-two SCI; and
   the first stage-two SCI includes a second pointer to the second stage-two SCI.

4. The method of claim 2, wherein:
   the control information includes a first pointer to the first stage-two SCI and a second pointer to the second stage-two SCI.

5. The method of claim 2, wherein:
   the first stage-two SCI includes a first time domain resource allocation (TDRA) field indicating a first set of contiguous symbols allocated to the low-latency TB; and the second stage-two SCI includes a second TDRA field indicating a second set of contiguous symbols allocated to the non-low-latency TB.

6. The method of claim 2, wherein:
the control information or the second stage-two SCI includes cross-slot schedule information for a subsequent slot after the slot.

7. The method of claim 1, wherein:
transmitting the low-latency TB and the non-low-latency TB comprises transmitting the low-latency TB and the non-low-latency TB to a single peer UE of the one or more peer UEs; and
the method further comprises:
configuring a stage-two sidelink control information (SCI) for the low-latency TB and the non-low-latency TB; and
transmitting the stage-two SCI to the single peer UE.

8. The method of claim 7, wherein:
the control information includes a reduced length destination identification of the single peer UE and a pointer to the stage-two SCI.

9. The method of claim 1, further comprising:
configuring a composite stage-two sidelink control information (SCI) for the low-latency TB and the non-low-latency TB.

10. The method of claim 9, wherein:
the composite stage-two SCI is rate matched to a first symbol with a first PSSCH demodulation reference signal (DMRS) or a PSSCH DMRS different from the first PSSCH DMRS.

11. The method of claim 1, wherein:
the control information includes an indicator indicating that the low-latency TB and the non-low-latency TB are time division multiplexed.

12. A user equipment (UE), comprising:
a memory comprising instructions;
a transceiver; and
one or more processors operatively coupled with the memory and the transceiver, the one or more processors configured to execute instructions in the memory to:
configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed; and
transmit the low-latency TB and the non-low-latency TB via a physical sidelink shared channel (PSSCH) and the control information via a physical sidelink control channel (PSCCH) to one or more peer UEs.

13. The UE of claim 12, wherein the one or more processors are further configured to:
configure a first stage-two sidelink control information (SCI) within the one or more first temporal resources and a second stage-two SCI within the one or more second temporal resources.

14. The UE of claim 13, wherein:
the control information includes a first pointer to the first stage-two SCI; and
the first stage-two SCI includes a second pointer to the second stage-two SCI.

15. The UE of claim 13, wherein:
the control information includes a first pointer to the first stage-two SCI and a second pointer to the second stage-two SCI.

16. The UE of claim 13, wherein:
the first stage-two SCI includes a first time domain resource allocation (TDRA) field indicating a first set of contiguous symbols allocated to the low-latency TB; and
the second stage-two SCI includes a second TDRA field indicating a second set of contiguous symbols allocated to the non-low-latency TB.

17. The UE of claim 13, wherein:
the control information or the second stage-two SCI includes cross-slot schedule information for a subsequent slot after the slot.

18. The UE of claim 12, wherein the one or more processors are further configured to:
transmit the low-latency TB and the non-low-latency TB to a single peer UE of the one or more peer UEs; and
configure a stage-two sidelink control information (SCI) for the low-latency TB and the non-low-latency TB; and
transmit the stage-two SCI to the single peer UE.

19. The UE of claim 18, wherein:
the control information includes a reduced length destination identification of the single peer UE and a pointer to the stage-two SCI.

20. The UE of claim 12, wherein the one or more processors are further configured to:
configure a composite stage-two sidelink control information (SCI) for the low-latency TB and the non-low-latency TB.

21. The UE of claim 20, wherein:
the composite stage-two SCI is rate matched to a first symbol with a first PSSCH demodulation reference signal (DMRS) or a PSSCH DMRS different from the first PSSCH DMRS.

22. The UE of claim 12, wherein:
the control information includes an indicator indicating that the low-latency TB and the non-low-latency TB are time division multiplexed.

23. A non-transitory computer readable medium having instructions stored therein that, when executed by one or more processors of a user equipment (UE), cause the one or more processors to:
configure, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed; and
transmit the low-latency TB and the non-low-latency TB via a physical sidelink shared channel (PSSCH) and the control information via a physical sidelink control channel (PSCCH) to one or more peer UEs.

24. The non-transitory computer readable medium of claim 23, further comprising instructions, when executed by the one or more processors, cause the one or more processors to:
configure a first stage-two sidelink control information (SCI) within the one or more first temporal resources and a second stage-two SCI within the one or more second temporal resources.

25. The non-transitory computer readable medium of claim 24, wherein:
the control information includes a first pointer to the first stage-two SCI; and
the first stage-two SCI includes a second pointer to the second stage-two SCI.

26. A method of wireless communication by a peer user equipment (UE), comprising:
receiving, in a slot, a low-latency transport block (TB) occupying one or more first temporal resources, a non-low-latency TB occupying one or more second temporal resources different from the one or more first temporal resources, and control information occupying at least a portion of the one or more first temporal resources, wherein the low-latency TB and the non-low-latency TB are time division multiplexed; and
decoding one or more of the low-latency TB or the non-low-latency TB identified in the control information for the peer UE.

27. The method of claim 26, further comprising:
calculating one or more physical sidelink feedback channel (PSFCH) indices using an equation (K+M+S)mod (Z*Y), where K is a level 1 (L1) source identifier (ID), M is a member ID of a groupcast option, S is one or more time domain shift indices, Z is a number of physical resource blocks (PRBs) per sub-channel, and Y is a cyclic shift per PRB; and
transmitting a hybrid automatic repeat request (HARQ) response indicating successfully decoding or failed decoding of the one or more of the low-latency TB or the non-low-latency TB, wherein one or more resources for the HARQ response is indicated by the PSFCH indices.

28. The method of claim 26, further comprising:
configuring, in a physical sidelink feedback channel (PSFCH) symbol, at least one of a first frequency resource for a first hybrid automatic repeat request (HARQ) response associated with the low-latency TB or a second frequency for a second HARQ response associated with the non-low-latency TB; and
transmitting the at least one of the first HARQ response or the second HARQ response.

29. The method of claim 26, further comprising:
configuring at least one of:
a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is one or more symbols after a last symbol of the one or more first temporal resources; or
a second HARQ resource, in a PSFCH symbol, for a second HARQ response associated with the non-low-latency TB; and
transmitting the at least one of the first HARQ response or the second HARQ response.

30. The method of claim 26, further comprising:
configuring at least one of:
a first hybrid automatic repeat request (HARQ) resource, in an enhanced physical sidelink feedback channel (ePSFCH) resource in a subsequent slot, for a first HARQ response associated with the low-latency TB, wherein a first symbol of the first HARQ resource is $k_1$ symbols after a last symbol of the one or more first temporal resources; or
a second HARQ resource, in the ePSFCH resource in the subsequent slot, for a second HARQ response associated with the non-low-latency TB, wherein a second symbol of the second HARQ resource is $k_2$ symbols after a last symbol of the one or more second temporal resources; and
transmitting the at least one of the first HARQ response or the second HARQ response.

* * * * *